UNITED STATES PATENT OFFICE.

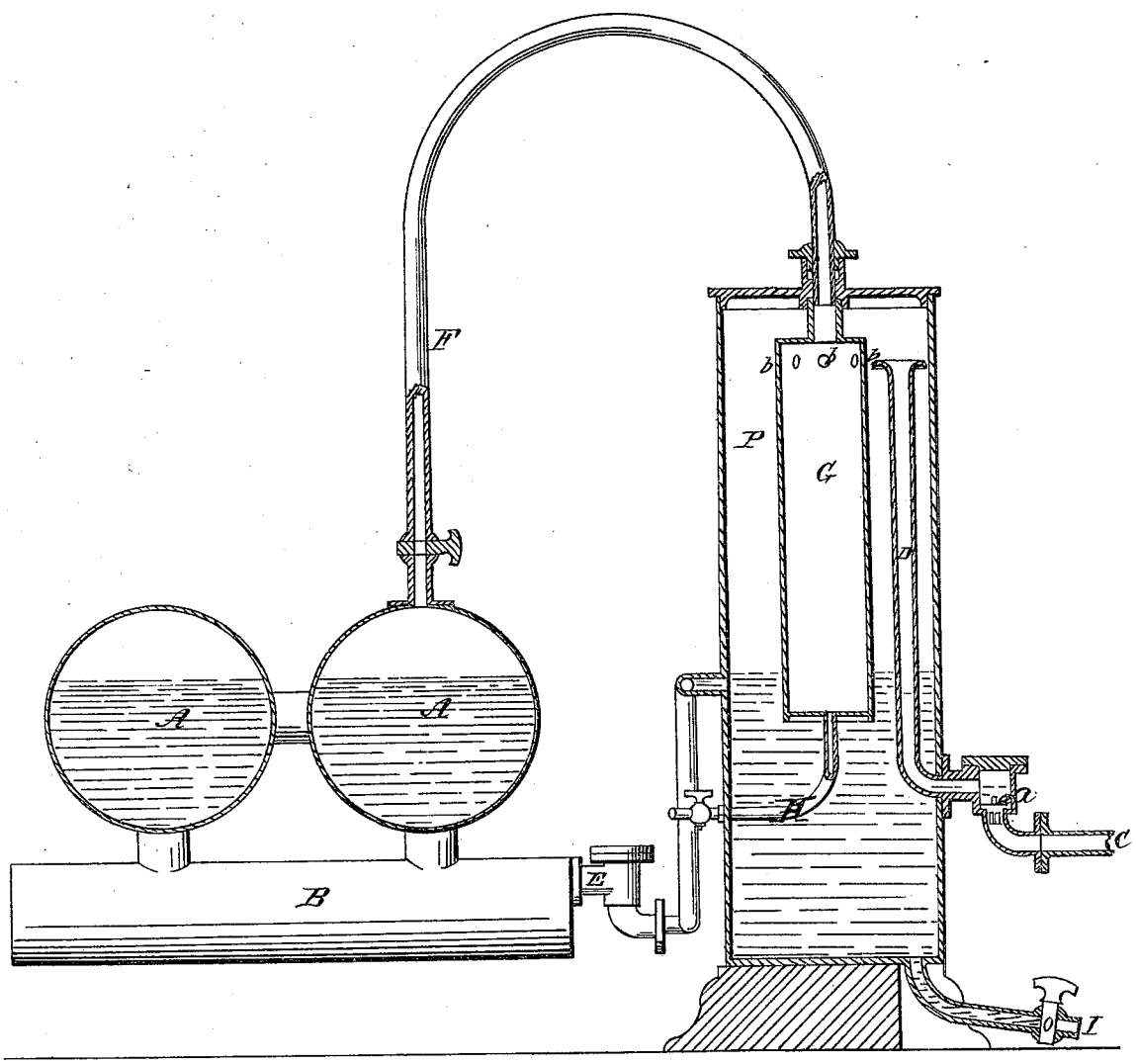

THOMAS SLOAN, OF ST. LOUIS, MISSOURI.

HEATING-FEED-WATER APPARATUS FOR STEAM-BOILERS.

Specification of Letters Patent No. 14,835, dated May 6, 1856.

*To all whom it may concern:*

Be it known that I, THOMAS SLOAN, of the city of St. Louis, in the State of Missouri, have invented a new and useful Apparatus for Purifying Feed-Water for Steam-Boilers; and I do hereby declare that the following is a full, clear, and exact description of the same, reference being had to the accompanying drawing, forming part of this specification, which represents a vertical section of the apparatus applied to a steam-boiler.

This invention consists in a vessel, the upper part of which is in free communication with the steam space of the boiler and the lower part with the water space thereof, provided with a certain arrangement of pipes and other appliances hereinafter specified, by which the feed water is introduced near the top of the said vessel and caused to descend in a thin sheet or otherwise in a diffused state through the steam space thereof, and afterward heated at or near its surface, while the lower part of the vessel is comparatively cool, whereby the mud and mineral matter is caused to precipitate itself in the said vessel and the water which remains always at the same level as in the boiler is supplied to the boiler from the said vessel at a point near the surface where it is in a pure state.

To enable others skilled in the art to make and use my invention, I will proceed to describe its construction and operation.

A, A, B, indicate the steam boiler.

P, is the purifying vessel which may be of upright cylindrical or other form, having its bottom about on a level with or lower than the lowest part of the boiler and extending upward as high or higher than the steam chamber of the boiler.

C, is the feed pipe furnished with the usual check valve *a*.

D is an upright pipe communicating with the feed pipe through the check valve *a*, and reaching nearly to the top of the purifying vessel, where it terminates in a funnel shaped mouth. This pipe forms the only communication between the feed pipe and the purifying vessel, and no direct communication is required between the feed pipe and the boiler.

E, is a water pipe which connects the purifying vessel and the boiler, the connection of the same with the purifying vessel being just below the intended water level of the boiler and its connection with the boiler being near the bottom thereof.

F, is a steam pipe which connects the steam chamber of the boiler with the upper part of the purifying vessel.

G is a chamber of upright cylindrical or other form arranged in the center of the purifying vessel and extending downward a short distance below the level of the water therein. The steam pipe F enters the top of this vessel and the communication between the said pipe and the upper part of the purifying vessel, is through openings *b, b*, near the top of the said chamber leading from the said chamber to the upper part of the purifying vessel but there is no other communication between the purifying vessel and the said chamber G.

H is a small pipe leading from the bottom of the chamber G, to a drain or suitable receptacle and furnished with a cock which may be opened at intervals to draw off any water of condensation from within the said chamber.

I, is a mud valve or blow-off cock at the bottom of the purifying vessel.

The operation of the apparatus is as follows. The water is driven by the feed pump through the pipe D, and overflows the funnel mouthpiece thereof in a thin stream in which state it descends into the lower part of the purifying vessel, where the level remains the same as in the boiler, the upper part thereof and the chamber G being filled with steam at the same pressure and temperature as in the boiler. In descending through the steam in the purifying vessel in the thin stream aforesaid, the water is heated to such a degree as to cause the precipitation of the greater portion of its impurities, and as the upper part of the body of water in the purifying vessel is heated by the steam in the chamber G, it is kept heated above the boiling point while that in the lower part is cooler and the precipitation is there finished, and the mud is caused to settle at the bottom of the purifying vessel, from whence it may be blown off at short intervals through the cock or valve I, while the mineral matter is caused to incrust itself upon the sides of the upper part of the said vessel, from whence it may be removed at convenient intervals, by means of picks, after blowing the water out of the boiler and the said vessel. The upper portion of the body of water in the purifying vessel is found in practice to be quite or nearly pure, and as all the water taken into the boiler is immediately below the surface level, none but pure water is admitted to the boiler. The experiments which have been made with the apparatus have been with water from the Mississippi River and have been eminently successful.

What I claim as my invention and desire to secure by Letters Patent, is,

1. A vessel separate from the boiler but communicating both with the steam and water chambers thereof in which the water previously to its entrance to the boiler, is heated by passing in a thin stream through the steam in its upper part and also by the contact of the steam with the top of the body of water contained therein substantially as herein specified.

2. The arrangement of the purifying vessel, the pipe D, with its funnel mouth, the internal heating chamber G and the pipes E and F, substantially as herein described.

THOMAS SLOAN.

Witnesses:
H. ROBINSON,
P. F. SAUNDERS.